(12) United States Patent
Narasimhan

(10) Patent No.: US 11,017,070 B2
(45) Date of Patent: May 25, 2021

(54) VISUAL DATA PROCESSING OF RESPONSE IMAGES FOR AUTHENTICATION

(71) Applicant: PAYPAL, INC., San Jose, CA (US)

(72) Inventor: Srivathsan Narasimhan, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 16/455,738

(22) Filed: Jun. 27, 2019

(65) Prior Publication Data

US 2019/0318077 A1   Oct. 17, 2019

Related U.S. Application Data

(63) Continuation of application No. 15/195,554, filed on Jun. 28, 2016, now Pat. No. 10,346,605.

(51) Int. Cl.
| | |
|---|---|
| *G06F 21/00* | (2013.01) |
| *G06F 21/36* | (2013.01) |
| *G06F 21/32* | (2013.01) |
| *H04L 29/06* | (2006.01) |

(52) U.S. Cl.
CPC ............ *G06F 21/36* (2013.01); *G06F 21/32* (2013.01); *H04L 63/0861* (2013.01)

(58) Field of Classification Search
CPC ....... G06F 21/36; G06F 21/32; H04L 63/0861
See application file for complete search history.

(56) References Cited

U.S. PATENT DOCUMENTS

| | | | |
|---|---|---|---|
| 4,291,222 A | 9/1981 | Grottrup | |
| 9,264,419 B1 | 2/2016 | Johansson et al. | |
| 9,305,155 B1 * | 4/2016 | Vo | H04L 63/0861 |
| 10,013,983 B1 * | 7/2018 | Johnson | H04W 12/0602 |
| 2004/0230843 A1 | 11/2004 | Jansen | |
| 2006/0282660 A1 | 12/2006 | Varghese et al. | |
| 2010/0083353 A1 | 4/2010 | Wang | |
| 2010/0115114 A1 * | 5/2010 | Headley | G10L 17/22 709/229 |
| 2011/0145901 A1 | 6/2011 | Di Crescenzo | |
| 2012/0281885 A1 | 11/2012 | Syrdal et al. | |
| 2012/0317640 A1 * | 12/2012 | Hammoud | G06F 21/316 726/19 |
| 2013/0015946 A1 | 1/2013 | Lau et al. | |
| 2013/0055381 A1 * | 2/2013 | Hao | G06F 21/32 726/18 |

(Continued)

*Primary Examiner* — Sarah Su
(74) *Attorney, Agent, or Firm* — Haynes and Boone, LLP

(57) ABSTRACT

There are provided systems and methods for visual data processing of mimed images for authentication. Authentication may be required for a user and/or an account of the user, for example, to verify the identity of the user or allow the user to access and use the account of the user. As an additional factor to authentication, increased authentication may be accomplished through who and what the user is, such as through facial recognition and biometrics of the user. During authentication, the user may be presented with a set of images or icons, such as digital emojis, that convey and emotion or idea. The user may be asked to mimic the emojis during authentication, where the user's facial expression is recorded. To authenticate the user, the recorded data may be compared to past data through facial recognition processing and image analysis to find similarities.

20 Claims, 6 Drawing Sheets

(56) References Cited

U.S. PATENT DOCUMENTS

| | | | |
|---|---|---|---|
| 2013/0061299 A1* | 3/2013 | Novak | H04L 67/10 |
| | | | 726/6 |
| 2013/0111580 A1* | 5/2013 | Checco | G06F 21/32 |
| | | | 726/19 |
| 2014/0075548 A1 | 3/2014 | Sampathkumaran et al. | |
| 2014/0165187 A1 | 6/2014 | Daesung | |
| 2014/0205157 A1 | 7/2014 | Suzuki | |
| 2015/0033304 A1 | 1/2015 | Fujiwara et al. | |
| 2015/0310259 A1 | 10/2015 | Lau et al. | |
| 2016/0065558 A1 | 3/2016 | Suresh et al. | |
| 2016/0132670 A1 | 5/2016 | Salama et al. | |
| 2016/0142536 A1 | 5/2016 | Bendi et al. | |
| 2016/0217438 A1 | 7/2016 | Wong | |
| 2017/0006028 A1 | 1/2017 | Tunnell et al. | |
| 2017/0255767 A1 | 9/2017 | Ren | |
| 2017/0270289 A1* | 9/2017 | Lymberopoulos | |
| | | | G06K 9/00382 |
| 2017/0344990 A1* | 11/2017 | Kohli | G06Q 20/40145 |
| 2018/0005272 A1 | 1/2018 | Todasco et al. | |
| 2018/0018514 A1 | 1/2018 | Azam et al. | |
| 2018/0189476 A1* | 7/2018 | Li | G06F 21/32 |

\* cited by examiner

VISUAL DATA PROCESSING OF RESPONSE IMAGES FOR AUTHENTICATION

CROSS REFERENCE TO RELATED APPLICATION

This continuation patent application claims priority to and the benefit of U.S. patent application Ser. No. 15/195,554, filed on Jun. 28, 2016, the entirety of the application is incorporated herein by reference.

TECHNICAL FIELD

The present application generally relates to visual data analysis and authentication, and more specifically to visual data processing of response images for authentication.

BACKGROUND

Users may utilize communication devices to perform various actions, including use of user accounts, which may be associated with email, transaction processing services, social networking, messaging, and other actions associated with online and offline accounts for the users. These users may require authentication in order verify an identity of the user and/or use the user account, for example, through entry of a username, password, and/or personal identification number (PIN). Such authentication credentials may be established for the user, and may be updated at future times. However, authentication credentials are susceptible to theft and/or discovery by unauthorized parties, creating possible issues of authentication security, malicious conduct, and/or fraud. For example, authentication based on what a user knows may be easily breached, often when the authentication is shared between accounts or other authentication sources. Thus, two factor or additional factor authentication may be used based on what a user has or is in possession of, such as a phone having a phone number, an email account, authentication cookies or token, or other device, data, etc. Similarly, these authentication mechanisms may be susceptible to copying and/or fraud, such as spoofing, mimicking, unauthorized access, or other malicious conduct. Thus, additional authentication based on whom or what a person is, such as biometrics, can often provide increase authentication security.

Figure 1A:
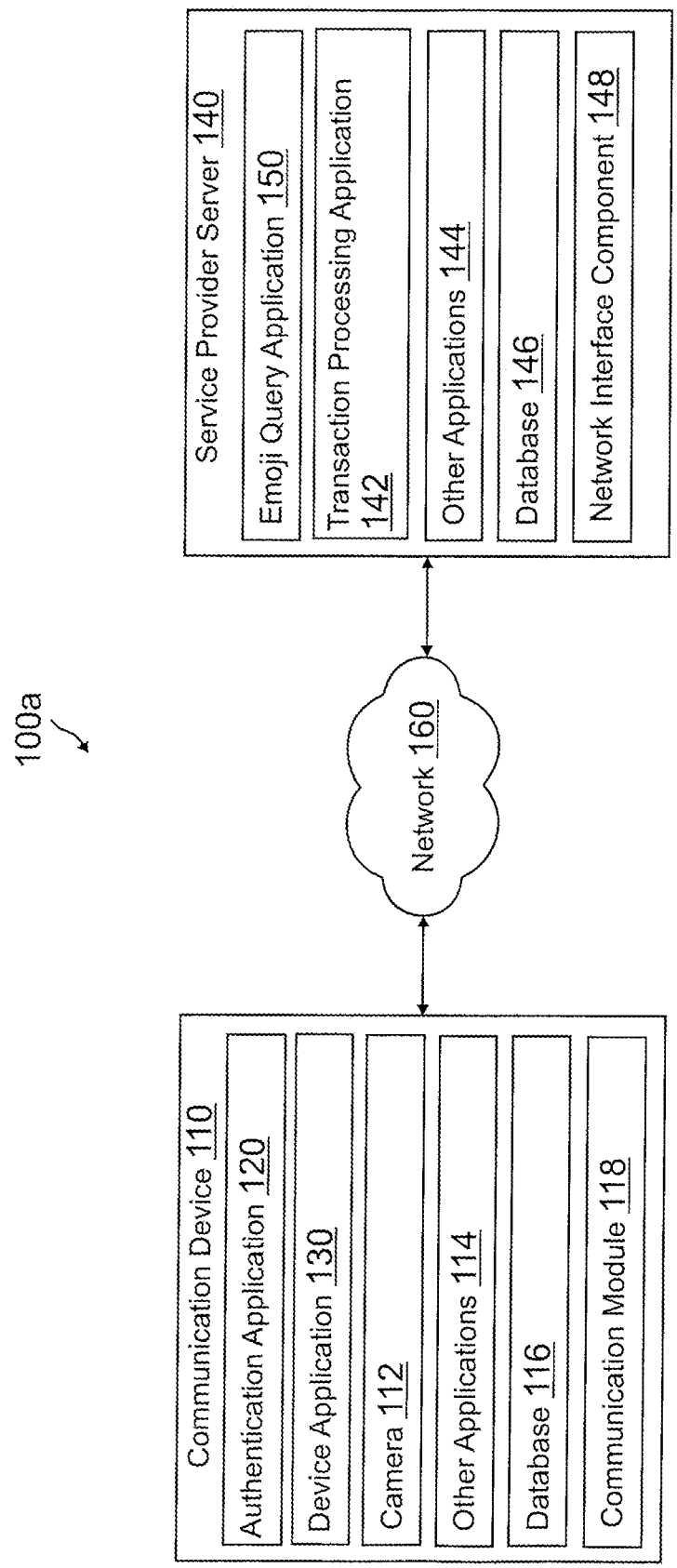
FIG. 1A is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for visual data processing of response images, including mimed or imitated images, for authentication. Systems suitable for practicing methods of the present disclosure are also provided.

Users may utilize various types of devices to capture images, including digital cameras, mobile smart phones, tablet computers, digital video recorders, gaming systems including mobile gaming systems, and other types electronic devices capable of capturing images or videos. Thus, although the terms "image," "video," or the like may be used throughout, it is understood that other forms of visual data may also be captured, including infrared visual data, x-ray data, or other types of visual media content or data that may be detected by an imaging device, such as a camera, infrared sensor, photodetector, etc. In this regard, an image may also include data capturing a representation or likeness of a user, such as facial data and/or body data that captures all or part of the user's face and/or body expressions, movements, features, motions, actions, and/or reactions at the time of capturing the image. For example, a user may utilize a device camera to capture the user's likeness (e.g., a "selfie") when intentionally photographing or videotaping the user (e.g., selecting an image recording application and requesting the application record the user's image). In other embodiments, the communication device may automatically record or otherwise capture/process the images, for example, on request a process of another application, device, or server, or detection of the process executing on the communication device and/or by the device/server of a service provider in communication with the communication device over a network connection. Additionally, the image may correspond to a single image, or may be part of a plurality of images, including videos having multiple frames or still images that may constitute video playback.

Thus, visual data having an image/video of a user may include an expression of the user shown through the user's facial and/or body data in the visual data, which may be defined by the movement, placement, or appearance of the user's facial/body features to express or convey an emotion, idea, or thought of the user. The expression may occur when the user has a response to an occurrence, such as other data or information presented to the user. The expression may also occur by actively requesting the user to convey the emotion, idea, or thought, for example, by asking the user to "express sadness." The expression may therefore be consciously performed by the user in response to a request or statement, or may be subconsciously performed and experienced by the user resulting from some experience of the user. For example, when consciously performed by the user, the user may be asked to mimic, mime, copy, or otherwise imitate a provided emotion, idea, thought, or other expression, for example, by providing the user a word or phrase for the expression or presenting an image or video displaying the expression.

Visual data of the user may then be captured having the expression displayed by the user. The visual data of the user captured by a computing device and including the facial and/or body expression of the user may include a single expression, such as an image or video of a user when the user is expressing sadness or happiness. The visual data of the user captured by a computing device may also include a plurality of different expressions for different emotions, ideas, or thoughts, such as several images of happiness, sadness, anger, confusion, embarrassment, etc. Additionally, the visual data may correspond to a single image or video, or a plurality of images or videos. Thus, the visual data may not only show the user's expression, but may also capture the user's facial or body features as the user moves from a neutral expression or current expression to the requested expression and/or between two or more requested expressions. Thus, the visual data may include transition states or appearances of the user as the user makes an expression and moves to another expression, including between different expressions and/or a neutral expression.

Emojis are common in electronic communication. Similar to expressions conveyed by a physical appearance of a user, an emoji may be used to convey an emotion, thought, idea, or other expression. In this regard, an emoji may often correspond to a small image or icon conveying the emotion, thought, idea, or other expression (i.e., small in interface display size and/or data size, but may also be displayed in large form, be animated and larger in data size, etc.). An emoji may be entered to electronic communications, which are used to convey the displayed expression to another user receiving the emoji. For example, an emoji may be sent through a text message, email, social networking platform, microblogging platform, media sharing service, or other messaging service, where one or more other users may view the emoji and determine the associated emotion, thought, idea, or expression with the emoji. The emoji may be used to convey the sending user's emotion, thought, idea, or expression, or may otherwise be used to convey information on an emotion, thought, idea, or expression, such as another user's emotion, thought, idea, or expression, a groups emotion, thought, idea, or expression, etc. Additionally, emojis may be interpreted differently by different users and/or groups of users as corresponding to differing emotions, thoughts, ideas, or expressions. For example and similar to facial and/or body expressions, interpretations of emojis may be user specific, location specific, specific to certain cultures and/or nationalities, or otherwise interpreted different depending on the social settings of the user sending and/or receiving the emoji.

In this regard, authentication of a user, including determining the user is a human and not a machine, and/or for an account of the user may be performed through display of one or more emojis, or other image/icon, to the user, and processing of visual data captured of the user when the user is asked to mime the displayed emoji. For example, a user may require payment services, for example, to provide a payment to a merchant, which may require authentication of the user to allow the user to utilize the account to send and/or receive payments. In this regard, the user's device may further include a payment application, which may be configured to send and receive payments to another party, such as another user and/or a merchant. The payment application may be associated with a payment provider, such as PayPal® or other online payment provider service, which may provide payments and other services on behalf of the user. User accounts and/or required user authentication may also be associated with other types of services, such as a messaging platform of the communication device (e.g., text, email, instant messaging, etc.), a social networking platform, a microblogging service, a video game, or other use of a device application and/or online service of a service provider. In other embodiments, the user may be required to be authenticated for device use or specific device use, such as a login process for the device and/or to utilize certain device functionality. In various embodiments, the user may also be required to authenticate their identity, for example, to a third party or service provider.

Thus, a set up process may be utilized to establish authentication credentials, queries, and other required information to authenticate the user, for example, for access and/or use of a user account. The user may establish authentication credentials that the user may know, such as a username, password, personal identification number, security questions, etc. The user may also establish additional factor authentication using real and/or virtual items of the user, such as a mobile phone device and phone number, email account, device cookies and tokens, etc. In order to provide additional account security, the user may also establish authentication based credentials and queries based on the user's expressions and facial/body data in visual data, for example, by recording images and/or video of the user is response to mimicking, miming, copying, or otherwise imitating displayed emojis to the user. A computing device for the user and/or a service provider may therefore receive visual data having one or more expressions of the user in response to one or more displayed images, icons, and/or emojis displayed for the user, for example, after the user attempts to mime or imitate or otherwise respond or react to information displayed in the images, icons, and/or emojis. The visual data may include data capturing and representing the user at the time the user mimes or imitates the images, icons, and/or emojis, for example, captured by a camera of the user's computing device or other optical recording device.

Thus, the user may be presented with the one or more images, icons, and/or emojis, and may be requested to mime or imitate each of the images, icons, and/or emojis as they are displayed on an interface screen. This may occur while the user is being recorded, for example, through one or more images or videos captured of the user by the camera recording the user. The resulting visual data, as well as each image, icon, or emoji causing generation of the visual data, may be stored by the computing device and/or service provider. Thus, the visual data may capture one or more of the user's expressions associated with the emotion(s), thought(s), idea(s), or other expression(s) that the user is asked to mime or imitate. Multiple images and/or video may be captured of the user in response to the same emoji or other displayed image or icon in order to determine multiple different performances by the user of an expression, for example, multiple different ways a user may smile. The visual data having the user's performance of an expression may therefore include performance of the expression by the user, including multiple different performances. Thus, for multiple expressions, each of the expressions may be stored with the requested emotion, though, idea, or other expression, for example, so that the visual data captures the user's expression for "happy," "sad," "tired," etc. Additionally, the visual data may capture transition states of the user between displayed images, icons, and/or emojis to capture the user's expression between different emotions, thoughts, ideas, or other expressions, as discussed herein. The visual data may be captured as a result of different patterns and/or series of images, icons, and/or emojis, which may provide transitions states between different expressions by the user. Additionally, the visual data may be used to generate a fingerprint for the user, where the fingerprint includes data for the user of facial patterns, features, and/or appearance for different expressions, as well as transition phases or time between different expressions and between a neutral state and different expressions. Thus, the visual data may include multiple images and/or videos documenting the user's expressions.

After establishment of historical or past visual data for the user having past expressions and transition phases between expressions (referred to herein as an "expression transition" or "expression transitions"), the user may utilize the past visual data as authentication for the user and/or an account of the user. For example, a service provider may provide an account to the user, such as the aforementioned payment service provider. The payment provider maintaining the account may require authentication of the user prior to allowing the user to access the account and engage in transaction processing services (e.g., send/receiving payments, transfers, etc.). As additional security, a service provider may require authentication of the user through mimed images by the user. Although it is described here as mimed "images," in further embodiments, the images may correspond to other types of digital images, including icons and emojis. In various embodiments, the user may set account preferences to require the mimed images authentication, or the service provider may require such authentication through mimed images. The service provider may generate a test authentication query of images, which may include a single image in certain embodiments, or may include a pattern or series of images, such as at least two different images, icons, or emojis in an ordered pattern. The authentication query may be generated for an authentication process for the user, for example, after the user generates a login request or other authentication request using the communication device of the user.

Once generated, the service provider may communicate the test authentication query to a communication device of the user. The authentication query may then be displayed to the user in order to authenticate the user. When displaying the authentication query, the image(s), icon(s), and/or emoji(s) may be displayed to the user on an output display device of the computing device. Additionally, an optical or visual recording device of the communication device, such as an attached or connectable digital camera, may further be activated to record current visual data of user in response to the image(s), icon(s), and/or emoji(s) in the authentication query. The user may then mime or imitate the image(s), icon(s), and/or emoji(s) by acting out or recreating an expression for what the user believes is the emotion, thought, idea, or expression conveyed by the image(s), icon(s), and/or emoji(s) displayed to the user. Present visual data of the user may then be captured of the user while the user mimes or imitates the image(s), icon(s), and/or emoji(s) and displays a corresponding expression, where the present visual data includes the user's appearance as the user displays an expression corresponding to the image(s), icon(s), and/or emoji(s). In various embodiments, the user may also be provided instructions during the authentication query, which may be generated with the authentication query and provided to the communication device with the authentication query. For example, the instructions may include a message alerting the user to activate a device camera or other recording device, as well as an executable option to do so in certain embodiments, as well as instructions to mime or imitate the following images that are displayed to the user on the communication device and the user views during the authentication query. Once recorded by the communication device, the presently captured visual data may be communicated to the service provider. In various embodiments, the communication device may perform similar authentication processes as those described herein in reference to the authentication processes of the service provider.

Thus, service provider (or communication device) may receive the visual data of the user in response to miming or imitating the image(s), icon(s), and/or emoji(s), which may be processed using the past visual data of the user miming the past displayed image(s), icon(s), and/or emoji(s). The present visual data may be compared or otherwise processed against or using the past visual data through facial, body, and/or object recognition, or other image processing technique, including analysis of image characteristics, pixels arrangement, vector analysis, etc. Thus the present visual data may be compared to the stored past visual data of the user to determine similarities and/or difference between the user when forming, transitioning between, and/or displaying an expression in the present visual data, and the same expression or a similar expression in the past visual data. For example, the facial data of the user in the present visual data having an expression or other facial appearance may be compared through feature comparison to other examples of facial data of the same/similar expression or other facial appearance in the past visual data. Using such comparison, facial recognition, and/or other image processing process or features, the communication device and/or service provider may identify similarities and/or differences between the user miming and/or imitating image(s), icon(s), and/or emoji(s) in the present visual data and the past visual data. The user may then be authenticated based on the similarities and/or differences. For example, if there are few or no similarities and many differences, the user may not be authenticated, whereas if there are many similarities and few to no differences, the user may be authenticated. Differing levels of certainty may be required by different tasks, accounts, applications, and/or service providers depending on the level of security. Additionally, a level of error may be incorporated to ensure that differences in user appearance due to hair and facial hair changes, makeup, age, or other factor do not result in a false positive or false negative during authentication. Thus, analysis of the user's current miming of image(s), icon(s), and/or emoji(s) may be compared to a fingerprint of the user's past miming of image(s), icon(s), and/or emoji(s) to determine whether to authenticate a user. As previously discussed, interpretation of the image(s), icon(s), and/or emoji(s) and the corresponding expression to display may be user dependent, for example, based on cultural or language, thus, the conveyed expression in the captured visual data of the user may be further ensured of security by matching user specific displayed expressions to the image(s), icon(s), and/or emoji(s). Additionally, further authentication credentials may also be requested in the authentication request and further used to authenticate the user, for example, a login name, password, PIN, fingerprint, other biometric, or other information identifying the user.

In various embodiments, whether to authenticate the user or not (e.g., whether to verify the identity of the user and/or provide account access), may be based on a similarity score between the similarities and/or differences detected during image and/or video analysis of the present visual data and the past visual data. For example, the similarity score may be based on a percentage, numerical number, grade, or other quantifier of the number of similarities/differences. The similarity score may be based on the total number of similarities and/or differences detected in image/video analysis, or may be based on the quality and/or comparison of the similarities and/or differences. In this regard, some similarities and/or differences in an expression in the present visual data and the past visual data may be more or less significant, such as mouth appearance or formation versus eye or eyelid appearance or formation. For example, hairstyle and facial hair may be weighed less or provided no weight as hairstyle and facial hair may change between authentication attempts for a user and/or be easily faked, imitated, or disguised by fraudulent or malicious users. Conversely, lips or eyes may be more difficult to change or otherwise manipulate between authentication attempts or by a fraudulent or malicious user, and thus may be provided a higher weight in an overall score. Other facial characteristics may also be provided difference scores and/or importance in a weighted score, where certain similarities and/or differences are assigned difference values in an overall similarity score based on the importance of the similarities and/or differences to determining that the user is the same user in the present visual data as the past visual data. Thus, the similarity score may be used to further verify the identity of the user and that the user is in common between the present visual data and the past visual data. In various embodiments, a threshold score or amount may be required to authenticate the user, where below the threshold score or amount does not allow authentication of the user, and above the threshold score or amount allows for authentication of the user.

In order to ensure the past visual data of the user is still representative of the user as the user changes in appearance, for example, as the user ages, changes appearance, or performs expressions differently, the service provider may update the past visual data with the present visual data when the service provider correctly authenticate the user using the present visual data. Thus, the present visual data that includes a representation of the user performing various expressions may be used to update the past visual data so the past visual data is current to the user's present appearance. Where the present visual data is used to determine that a fraudulent authentication is attempted, for example, by another user, the present visual data may also be used as data points to match against other fraudulent authentication requests, including the image/video data in the present video data, as well as a location of the authentication request, IP address or other network address of the request, device identifier originating the request, and other information associated with the request. Moreover, if the user has not performed an emoji based authentication for a period of time or new visual data is required to update the past visual data, the user may be requested to repeat the steps of establishing the past visual data for authenticating the user.

The authentication utilizing the past visual data may require additional authentication processes and input by the user. Thus, the authentication through past visual data of the user having expression of the user may be performed in certain embodiments only when a login request or other authentication request detects a degree of uncertainty or potential risk/fraud. For example, the authentication process through the past visual data may be required when the user attempts an access from a new device or new location. The authentication process may also be required if the user fails multiple other authentication requests. Thus, the service provider may only require enhanced authentication during authentication requests indicating some degree of risk or fraud, which may be set according to the security required by the service provider, user, and/or account.

Moreover, when performing authentication for the user and/or to update the authentication process and system, trained human agents may process any false positives and/or false negatives of authentication of the user to update the system and perform better authentication for the user and/or other users using past visual data for performance of expressions and present visual data having performance of at least one emoji presented to the user. In this regard, an agent may view one or more false positives that occur when a correct user is attempting to authenticate through visual data processing of mimed emojis but is rejected and not authenticated. Similarly, the agent may view one or more false negatives that occur when a fraudster attempts authentication of another user's account or otherwise breaches the authentication process using visual data of the fraudster and attempts an account takeover. Thus, the agent may assist in adjusting weighted features, match scoring, or other visual data point to aid in machine learning models tuning for the process to authenticate through visual data of mimed emojis. For example, an agent may be require to tune an artificial intelligence (AI) processing of past and present visual data, which may be offered by an AI computing source (e.g., IBM Watson®, Google DeepMind®, etc.). The agents may view the false positives and/or false negatives in order to correct authentication processes using past/present visual data of a user miming one or more emojis. In this regard, a smart tightening process may be used where decisions made in the matching algorithm are based on a finer granularity of vector analysis in the past/present visual data, requiring more pixels or higher fidelity in visual data, and/or utilizing more points of interest in the visual data (e.g., additional feature analysis of facial and/or body visual data). Additionally, selective high risk tightening processes may be implemented to increase authentication security by an agent. In such embodiments, once a pattern of authentication is established, high risk and low risk transactions may be determined, which may be based on factors such as originating authentication device geo-location, IP address, login time, transaction amount, transaction item, or other information. In this regard, high risk characteristics of the transaction (e.g., transactions originating from Nigeria or Vietnam where the user generally transacts in California) can be subject to more computational complexity based on requirements set by the agent.

In various embodiments, the service provider may further allow or request the user to perform different facial and/or body expressions when responding to an emoji, which may be particular to the user and only known to the user. In this regard, the user may make up their own response and expression when viewing an emoji or other image/icon, which may not mime or imitate the emoji but instead provide a different expression. For example, a user profile may indicate that the authorized user responds to a "sad" face emoji with a smile. This provides additional security in that only the authorized user will know what type of expression to make in response to a certain emoji, such that an unauthorized user in possession of the user phone cannot just imitate the emoji. The service provider may be unaware of the user's different expression when requesting the user to mime the emoji so that the user's personal response to the emoji is kept more secure. In this regard, the service provider may perform image analysis of received visual data during an authentication process of the user performing the same expression that is different from the emoji, which may be compared to the past visual data of the same expression that is different from the emoji to authenticate the user. In other embodiments, the service provider may inform the user to perform a different expression or choose their own expression that is different than the displayed emoji.

FIG. 1A is a block diagram of a networked system 100a suitable for implementing the processes described herein, according to an embodiment. As shown, system 100a may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1A may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100a includes a communication device 110 and a service provider server 140 in communication over a network 160. A user (not shown) may utilize communication device 110 to utilize the various features available for communication device 110, which may include processes and/or applications that may perform user authentication through recording visual data of the user while the user mimes emojis or other digital images or icons displayed to the user. In this regard, the user may set past visual data for the user miming emojis with service provider server 140. In order to authenticate the user, the user may later be presented at least one emoji or other image/icon and be asked to mime or imitate the displayed emoji(s). Visual data of the user while miming the displayed emoji(s) may be captured by communication device 110, which may then be transmitted to service provider server 140. Service provider server 140 may compare the presently recorded visual data to past recorded visual data of the user in order to authenticate the user.

Communication device 110 and service provider server 140 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100a, and/or accessible over network 160.

Communication device 110 may be implemented as a communication device that may utilize appropriate hardware and software configured for wired and/or wireless communication with service provider server 140. For example, in one embodiment, communication device 110 may be implemented as a personal computer (PC), telephonic device, a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. In various embodiments, communication device 110 may also be associated with another entity that may perform authentication of the user, such as an automatic teller machine (ATM) for a bank, a point-of-sale (POS) device for a merchant, or other device that may authenticate a user for a transaction. Communication device 110 may include or be associated with a user utilizing authentication through miming of emojis or other images/icons displayed to the user. Although only one communication device is shown, a plurality of communication devices may function similarly.

Communication device 110 of FIG. 1A contains an authentication application 120, a device application 130, a camera 112, other applications 114, a database 116, and a communication module 118. Device application 130 and other applications 114 may correspond to executable processes, procedures, and/or applications with associated hardware. In other embodiments, communication device 110 may include additional or different modules having specialized hardware and/or software as required.

Authentication application 120 may correspond to one or more processes to execute modules and associated specialized hardware of communication device 110 to provide an application to capture visual data of a user associated with communication device 110 using a device camera of communication device 110, such as camera 112, where authentication application 120 may provide the visual data to service provider server 140 for use in authenticating the user. In this regard, authentication application 120 may correspond to specialized hardware and/or software of communication device 110 to capture images, where the images may correspond to still images, video images, or other digital media content. Authentication application 120 may provide additionally processing after capturing visual data, including cropping, adjusting color/saturation/resolution, or other editing procedures. Authentication application 120 may utilize functions associated with camera 112, such as flash, zoom, image resolution, or other camera parameter. Additionally, authentication application 120 may provide for creating, accessing, and editing a library of visual data, such as a photo book or video library of captured visual data stored in database 114. In other embodiments, one or more of the authentication features provided by service provider server 140 may also or instead be provided by authentication application 120, for example, authentication of a user through visual data captured of a user miming emojis.

In this regard, a user associated with communication device may utilize authentication application 120 with camera 112 with authentication application 120 to record a still image, video or other visual data that captures the user associated with communication device 110, for example, through recording the user's face and/or body. The recorded visual data may therefore include facial data and/or body data that includes the user's features and appearance. Additionally, the recorded visual data may further include an expression of the user, where the expression conveys an emotion, thought, or idea. For example, the captured image may contain a captured portrait of the user, such as a facial image and/or full body image, where the user is expressing a state, such as "happy," "sad," "angry," "confused," "preoccupied," etc. The captured visual data by authentication application 120 having one or more expressions of the user may be communicated to service provider server 140 for processing. However, in other embodiments, authentication application 120 may determine the expression of the user and/or perform authentication based on captured visual data.

Thus, in order to perform authentication through captured visual data, authentication application 120 may first establish base visual data of the user performing expressions. In this regard, authentication application 120 may receive a request to establish an authentication process through visual data of the user performing expressions from service provider server 140. In other embodiments, the user may wish to establish the authentication process, and may utilize one or more application processes and/or processes with service provider server 140 that may request establishment the authentication process and the base visual data. In order to establish the base visual data, authentication application 120 may display at least one emoji or other image or icon that displays information that conveys an emotion, thought, idea, or other expression. The emoji(s) for display to the user may be received by authentication application 120 from service provider server 140. For example, service provider server 140 may establish a test emoji and/or test emoji pattern or other test data that establishes the base visual data, which may include one or more emojis or other images/icons, as discussed herein. In other embodiments, authentication application 120 may determine the test emoji and/or test emoji pattern, or may be requested to establish the test data by service provider server 140 (e.g., based on stored emojis). In various embodiments, the test data may include instructions to the user for how to establish the base visual data and authentication process through miming displayed emojis. For example, the instructions may instruct the user to turn on a device camera, and may include an executable processes to turn on camera 112 of communication device 110. The instructions may further instruct the user to mime or imitate content displayed to the user, such as emojis or other images/icons.

Thus, the test data including at least one emoji, image, or icon, as well as the instructions, may then be output to the user using an output display device of communication device 110. Camera 112 of communication device 110 may capture base visual data of the user while the user is miming the emoji(s) displayed to the user. The visual data may therefore include the user miming or imitating the emoji(s), which may be established as the base visual data for the user having the user expressing the emotion, thought, or ide of the emoji(s). The base visual data may also be associated with the displayed emoji(s), so that the user's facial and/or body appearance in the base visual data at the time of miming the emoji(s), as well as in transitions states between a rest state and/or another expression, is associated with the corresponding displayed emoji(s). Thus, the base visual data may include necessary images and/or video of a user during an expression miming a corresponding emoji. The base visual data may then be communicated to service provider server 140 for storage as past visual data of the user performing expressions and use in authenticating the user. In various embodiments, communication device 110 may also store the past visual data to database 116 for use in later authenticating the user through analysis of captured visual data of the user miming expressions in response to displayed emojis or other images/icons.

Authentication application 120 may also be used to execute an authentication process, which may utilize the past visual data (e.g., the aforementioned base visual data generated for the user of the user having expressions miming emojis). In this regard, authentication application 120 may receive a request for user authentication, for example, for a login request for an account or application of communication device 110 or for communication device 110. In other embodiments, other authentication requests for the user and/or for an account of the user may be received (e.g., in order to perform a transaction and/or transaction processing), for example, when requesting authentication of a user's identity for various application and/or service provider processes. The authentication request may be communicated to service provider server 140 for processing. Service provider server 140 may determine one or more emojis to present to the user in an authentication query for completion by the user, as discussed herein. Thus, authentication application 120 may receive the authentication query from service provider server 140. In other embodiments, authentication application 120 may generate the authentication query, as discussed herein by reference to service provider server 140, which may be generated in response to the authentication query and/or on request by service provider server 140. Once received or generated, authentication application 120 may display the authentication query to the user through an output device of communication device 110. In various embodiments, the authentication query may include instructions similar to the instructions to establish the past visual data, such as instructions to turn on camera 112, as well as a process to activate camera 112 and begin recording, and instructions to mime or imitate displayed emojis or other images/icons.

Thus, authentication application 120 may display the emoji(s) and/or other image(s)/icon(s) of the authentication query to the user of communication device 110. Authentication application 120 may record present visual data of the user in response to displaying the authentication query to the user, for example, as the user mimes or imitates the emoji(s) in the authentication query. The present visual data may be recorded with timestamps or other metadata similar to the past visual data so that the visual data captured for the user at the time of miming an emoji may be determined. Thus, the present visual data may include images and/or videos of a user at a time of miming an emoji, so that the present visual data may be compared to past visual data of the user miming the same emoji in order to determine similarities and whether the user in the present visual data is the same user in the past visual data for use in authenticating the user. Additionally, the present visual data may capture images and/or video between miming an emoji and a rest state for an expression of the user, as well as between miming different emojis and acting out different expressions. Once the present visual data is captured, the present visual data may be communicated to service provider server 140 for processing and determining whether to authenticate the user, as discussed herein. In other embodiments, authentication application 120 may utilize the present visual data with stored past visual data of the user for authentication in a process similar to those executed by service provider server 140. Once results of processing the present visual data with the past visual data is determined (e.g., a determination of whether to authenticate the user or reject authentication of the user), the results may be used with device application 130, for example, to authenticate the user for processes of device application 130. In further embodiments, if the user is not authenticated, additional emoji(s) and/or patterns of emoji(s) may be determined and displayed to the user to collect additional visual data in order to attempt to authenticate the user.

Device application 130 may correspond to one or more processes to execute modules and associated devices of communication device 110 to execute an application and associated processes of communication device 110, which may include processes executed based on authentication of the user associated with communication device 110 using authentication application 120 with camera 112. In this regard, device application 130 may correspond to specialized hardware and/or software utilized by communication device 110 to execute a device application, which may be utilized to perform various online and/or virtual actions, including electronic transaction processing (e.g., payments, transfers, and/or withdrawals, which may include ATM withdrawals and/or POS device transactions), messaging, merchant shopping and purchasing, social networking, and other types of electronic actions. For example, device application 130 may correspond to messaging applications (e.g., email, SMS/MMS, instant messaging, and/or social networking messaging), Internet browsers (e.g., browser histories and online interactions), Internet search engines, social networking applications, microblogging applications, merchant and shopping applications, travel applications (e.g., travel fare reservation and purchasing applications including air travel, as well as local travel applications for utilizing subways, taxis, car rentals, and other transportation local to the user), mapping applications, or other types of device applications. Device application 130 may correspond to media viewing/sharing applications, video games, word processors and associated applications, and/or other types of modules, processes, and applications. Device application 130 may also correspond to an application for biometrics, exercise data, and/or nutritional information, which may be input by the user and/or captured with the assistance of a connected device, such as a pedometer and/or heart rate monitor (e.g., a FITBIT® or similar device using a short range wireless communication with communication device 110). Device application 130 may interface with authentication application 120 and/or service provider server 140 to perform authentication of the user associated with communication device 110 using one or more processes to analyze present visual data of the user in response to miming an emoji or pattern of emojis based on past visual data of the user.

For example, in certain embodiments, the present visual data may be captured during an authentication request in response to an authentication query having one or more emojis for display to the user. For example, device application 130 may present information to the user of communication device 110 through an output device of communication device 110 (e.g., audio, visual, and/or audiovisual content). In various embodiments, device application 130 may request authentication application 120 capture the visual data of the user during presentation of the authentication query, and may utilize the present visual data to authenticate the user. Once authenticated, the user may utilize one or more of the processes of communication device 110, for example, transaction processing service, which may utilize an account of the user with service provider server 140.

One or more of the aforementioned features and/or processes of authentication application 120 may be included within device application 130 or vice versa, for example, to provide their respective features within one application and/or application interface.

Camera 112 corresponds to an optical device of communication device 110 enabling a user associated with communication device 110 to capture or record images, including still and/or video images. Camera 112 may correspond to a digital camera on communication device 110, or may more generally correspond to any device capable of capturing or recording an image, video, or other digital media with the capability to capture visual data of the user associated with communication device 110, including infrared imaging or other types imaging devices. Camera 112 may include various features, such as zoom, flash, focus correction, shutter speed controls, or other various features usable to capture one or more images of the first user, the second user, and/or other users. Camera 112 may further display a preview and/or captured image to the second user through another device of communication device 110, such as a viewfinder, screen (e.g., mobile phone screen), or other display. Camera 112 may interface with one or more applications of communication device 110 for the purposes of capturing images, videos, and/or other visual data of the user associated with communication device 110, for example, during authentication of the user by authentication application 120, which may be performed to allow use of one or more processes of device application 130, as discussed herein.

In various embodiments, communication device 110 includes other applications 114 as may be desired in particular embodiments to provide features to communication device 110, for example, those applications, processes, and/or features that may not be provided by one or more of authentication application 120 and/or device application 130. For example, other applications 114 may include security applications for implementing client-side security features, programmatic client applications for interfacing with appropriate application programming interfaces (APIs) over network 160, or other types of applications. Other applications 114 may also include email, texting, voice and IM applications that allow a user to send and receive emails, calls, texts, and other notifications through network 160. In various embodiments, other applications 114 may include financial applications, such as banking applications. Other applications 114 may also include other location detection applications, which may be used to determine a location for the user, such as a mapping, compass, and/or GPS application, which can include a specialized GPS receiver that obtains location information for communication device 110 and processes the location information to determine a location of communication device 110 and the user. Other applications 114 may include social networking applications, media viewing, and/or merchant applications. Other applications 114 may include device interfaces and other display modules that may receive input from the user and/or output information to the user. For example, other applications 114 may contain software programs, executable by a processor, including a graphical user interface (GUI) configured to provide an interface to the user. Other applications 114 may therefore use devices of communication device 110, such as display devices capable of displaying information to users and other output devices.

Communication device 110 may further include database 116 stored to a transitory and/or non-transitory memory of communication device 110, which may store various applications and data and be utilized during execution of various modules of communication device 110. Thus, database 116 may include, for example, identifiers such as operating system registry entries, cookies associated with device application 130 and/or other applications 114, identifiers associated with hardware of communication device 110, or other appropriate identifiers, such as identifiers used for payment/user/device authentication or identification, which may be communicated as identifying communication device 110 to service provider server 140. Database 116 may include past visual data of a user, which may be communication to service provider server 140 and/or stored by communication device 110 for use in authenticating the user of communication device 110. Additionally, present visual data of a user captured during an authentication request in response to displaying an authentication query may also be stored to database 116 and/or communicated to service provider server 140.

Communication device 110 includes at least one communication module 118 adapted to communicate with service provider server 140. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 118 may communicate directly with nearby devices using short range communications, such as Bluetooth Low Energy, LTE Direct, WiFi, radio frequency, infrared, Bluetooth, and near field communications.

Service provider server 140 may be maintained, for example, by an online service provider, which may provide authentication services, as well as payment services, to one or more users. In this regard, service provider server 140 includes one or more processing applications which may be configured to interact with communication device 110 and/or another device/server to facilitate connecting users having a shared interest. In one example, service provider server 140 may be provided by PayPal®, Inc. of San Jose, Calif., USA. However, in other embodiments, service provider server 140 may be maintained by or include another type of service provider, which may provide the aforementioned services to a plurality of users.

Service provider server 140 of FIG. 1A includes an emoji query application 150, a transaction processing application 142, other applications 144, a database 146, and a network interface component 148. Transaction processing application 142 and other applications 144 may correspond to executable processes, procedures, and/or applications with associated hardware. In other embodiments, service provider server 140 may include additional or different modules having specialized hardware and/or software as required.

Emoji query application 150 may correspond to one or more processes to execute software modules and associated specialized hardware of service provider server 140 to provide authentication of a user through visual data of a user captured in response to displaying emojis or other images/icons to the user, where the visual data may include the user miming the displayed information. In this regard, emoji query application 150 may correspond to specialized hardware and/or software to first receive a request to establish emoji or other image/icon authentication process for the user through visual data of the user miming emojis or other images/icons. In various embodiments, service provider server may automatically generate the request for emoji query application 150 to establish the authentication process, for example, based on the terms of authentication and/or required security of service provider server 140. Based on the request, emoji query application 150 may determine at least one emoji (or other image/icon) to display to the user in a test emoji or pattern of emojis in order to receive base visual data of the user, where the base visual data is used as the past visual data to later compare to receive presented visual data for use in authenticating the user. Thus, the base visual data may be secure, for example, by requiring establishment of the base visual data during an account enrollment process or after requiring authentication credentials, personal information, and/or financial information from the user. The test emoji or pattern of emojis may be communicated to communication device 110 for display to the user and capture of the base visual data. The test emoji or pattern of emojis and/or a later authentication query of one or more emojis (e.g., the selection of the emojis and generation of the patter) may be determined and based age, sex, demographics, psychographics, and various population segments. The test emoji(s) may include instructions to mime the emoji(s) when displayed to the user. In response, emoji query application 150 may receive the base visual data for the user based on the test data (e.g., the test emoji(s) displayed to the user) from communication device 110. The base visual data may include image and/or video data of the user performing one or more expressions, as well as image and/or video data between a rest expression for the user and the performed expression(s) and/or between the performed expression(s). Emoji query application 150 may store the base visual data as the past visual data of the user for use in later authenticating the user. Thus, the past visual data may correspond to a fingerprint of the user's past miming of the emoji(s) presented to the user, which may be used for authentication of the user based on future comparisons during an authentication request. Additionally, as interpretation of the emoji(s) may be user dependent, the corresponding visual fingerprint of the user may be different from other user's fingerprint based on the user's miming emoji(s).

Emoji query application 150 may receive an authentication request for the user, for example, from communication device 110 in order to authenticate the user and/or allow access and/or use to an application, device, and/or account of the user. The authentication request may correspond to a login request. In response to the authentication request, emoji query application 150 may determine an authentication query required to be completed by the user in order to authenticate the user. The authentication query may include one or more emojis (or other image/icon) for display to the user during the authentication request, where the authentication query displays the emoji(s) during the authentication request in order to have the user mime or otherwise imitate the displayed emoji(s). Thus, the authentication query may further include instructions for the user, where the instructions include a message instructing the user to activate or turn on a device camera (e.g., camera 112) as well as mime the displayed emoji(s) in the authentication query as the emoji(s) are presented to the user. The authentication query may further include an executable process to active camera 112 of communication device 110. Once generated, the authentication query may be communicated to communication device 110 for processing and display to the user.

Emoji query application 150 may then receive the present visual data of the user in response to viewing and miming the emoji(s) in the authentication query. Emoji query application 150 may then access the past visual data of the user stored to database 146. Emoji query application 150 may compare the present visual data of the user during the authentication request to the past visual data established for the user. The present visual data may be compared or otherwise processed against or using the past visual data by emoji query application 150 through facial, body, and/or object recognition, or other image processing technique to determine similarities and/or differences, including analysis of image characteristics, pixels arrangement, vector analysis, etc. Thus the present visual data may be compared to the stored past visual data of the user to determine similarities and/or difference between the user when the user forms, transitions between, and/or displays an expression in the present visual data and the past visual data. For example, the facial data of the user in the present visual data having an expression or other facial appearance may be compared through feature comparison to other examples of facial data of the same/similar expression or other facial appearance in the past visual data. Using such comparison, facial recognition, and/or other image processing process or features, emoji query application 150 may identify similarities and/or differences between the user miming the emoji(s) from the authentication query and miming the same or similar emoji(s) in the past visual data.

Authentication of the user may be based on the similarities and/or differences between the present visual data and the past visual data for the user miming the emoji(s). The similarities may be based on a cumulative number of similarities and/or differences, or score, percentage, or other determination made that determines whether the user in the present visual data miming the emoji(s) of the authentication query matches the user in the past visual data miming the same or similar emojis. Thus, a certainty determination may be made of whether the user is the same between the present visual data and/or the past visual data, or whether it appears to be a different user or some other indication of fraud (e.g., a computer generated user, mask, etc.). The level of certainty may depend on the required authentication and associated security. Additionally, a level of error may be incorporated to ensure that differences in user appearance due to hair and facial hair changes, makeup, age, or other factor do not result in a false positive or false negative during authentication. The authentication may also be based on a similarity score between the similarities and/or differences detected during image and/or video analysis of the present visual data and the past visual data by emoji query application 150. For example, the similarity score may be based on a percentage, numerical number, grade, or other quantifier of the number of similarities/differences. Additionally, different similarities and/or differences may be provided different weights in the overall similarity score so that certain similarities/difference in the present visual data and the past visual data may be more or less significant. Emoji query application 150 may require that the similarity score exceed a threshold score or amount in order to authenticate the user. For example, the score may indicate a 80% similarity, where emoji query application 150 requires a 75% score in order to authenticate the user. In such an embodiment, emoji query application 150 may then authenticate the user. In various embodiments where users may appear similar (e.g., identical twins), additional authentication for a specific one of the users may be required, for example, a fingerprint, retinal scan, or other biometric. Thus, such information may be required when it is determined that the user may be confused with another user (e.g., determination that the user has a twin, which may be determined using publically available information, such as birth records).

Additionally, emoji query application 150 may update the past visual data using the present visual data and/or by request additional base visual data at a later time, for example, to update the past visual data based on changes in appearance as the user ages, changes appearance, or performs expressions differently. Thus, the present visual data that includes a representation of the user performing various expressions may be used to update the past visual data so the past visual data is current to the user's present appearance. Where the present visual data is used to determine that a fraudulent authentication is attempted, for example, by another user, the present visual data may also be used as data points to match against other fraudulent authentication requests, including the image/video data in the present video data, as well as a location of the authentication request, IP address or other network address of the request, device identifier originating the request, and other information associated with the request, including biometrics of the user such as a fingerprint, retinal scan, and/or heart rate. Moreover, if the user has not performed an emoji based authentication for a period of time or new visual data is required to update the past visual data, the user may be requested to repeat the steps of establishing the past visual data for authenticating the user by emoji query application 150.

Transaction processing application 142 may correspond to one or more processes to execute software modules and associated specialized hardware of service provider server 140 to provide payment services to users, for example though a payment account and/or payment instruments, which may include payment during transaction processing. In this regard, transaction processing application 142 may correspond to specialized hardware and/or software to provide payment services and payment accounts, including digital wallets storing payment instruments. The payment services may allow for a payment to a user and/or merchant through a payment instrument, including a credit/debit card, banking account, payment account with service provider server 140, and/or other financial instrument. In order to establish a payment account for a user to send and receive payments, transaction processing application 142 may receive information requesting establishment of the payment account. The information may include user personal and/or financial information. Additionally, the information may include authentication information, such as a login, account name, password, PIN, or other account creation information. The authentication information may further include past visual data for a user stored in response to requesting that the user mime displayed emojis, where the user's appearance during miming the displayed emojis is recorded as base visual data for the user and communicated to service provider server 140. The user may provide a name, address, social security number, or other personal information necessary to establish the account and/or effectuate payments through the account. Transaction processing application 142 may further allow the user to service and maintain the payment account, for example, by adding and removing payment instruments. Transaction processing application 142 may be used to determine a current task that a user associated with communication device 110 is performing or initiating, such as transaction processing with another user or merchant. Thus, transaction processing application 142 may further request authentication of the user, for example, using emoji query application 150 with communication device 110. Such authentication may be performed through analyzing visual data of the user in response to a displayed authentication query having one or more displayable emojis. In order to perform transaction processing and/or payments, transaction processing application 142 may debit an account of the user and provide the payment to an account of the merchant or other user. Transaction processing application 142 may also be used to provide transaction histories for processed transactions.

In various embodiments, service provider server 140 includes other applications 144 as may be desired in particular embodiments to provide features to service provider server 140. For example, other applications 144 may include security applications for implementing server-side security features, programmatic client applications for interfacing with appropriate application programming interfaces (APIs) over network 160, or other types of applications. Additionally, other applications 144 may include one or more applications, which may provide the features and/or service described in reference to authentication application 120 and/or device application 130 of communication device 110, such as authentication using visual data of a user miming emojis. Other applications 144 may contain software programs, executable by a processor, including a graphical user interface (GUI), configured to provide an interface to the user when accessing service provider server 140, where the user or other users may interact with the GUI to more easily view and communicate information. In various embodiments, other applications 144 may include connection and/or communication applications, which may be utilized to communicate information to over network 160.

Additionally, service provider server 140 includes database 146. As previously discussed, a user may establish one or more digital wallets and/or payment accounts with service provider server 140. Digital wallets and/or payment accounts in database 146 may include user information, such as name, address, birth date, payment instruments/funding sources, additional user financial information, user preferences, and/or other desired user data. Users may link to their respective digital wallets and/or payment accounts through an account, user, and/or device identifier. Thus, when an identifier is transmitted to service provider server 140, e.g., from communication device 110, one or more digital wallets and/or payment accounts belonging to the users may be found. Database 146 may also store past visual data of a user miming emojis, as well as received present visual data used to authenticate the user using the past visual data.

In various embodiments, service provider server 140 includes at least one network interface component 148 adapted to communicate communication device 110 over network 160. In various embodiments, network interface component 148 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 160 may be implemented as a single network or a combination of multiple networks. For example, in various embodiments, network 160 may include the Internet or one or more intranets, landline networks, wireless networks, and/or other appropriate types of networks. Thus, network 160 may correspond to small scale communication networks, such as a private or local area network, or a larger scale network, such as a wide area network or the Internet, accessible by the various components of system 100*a*.

Figure 1B:
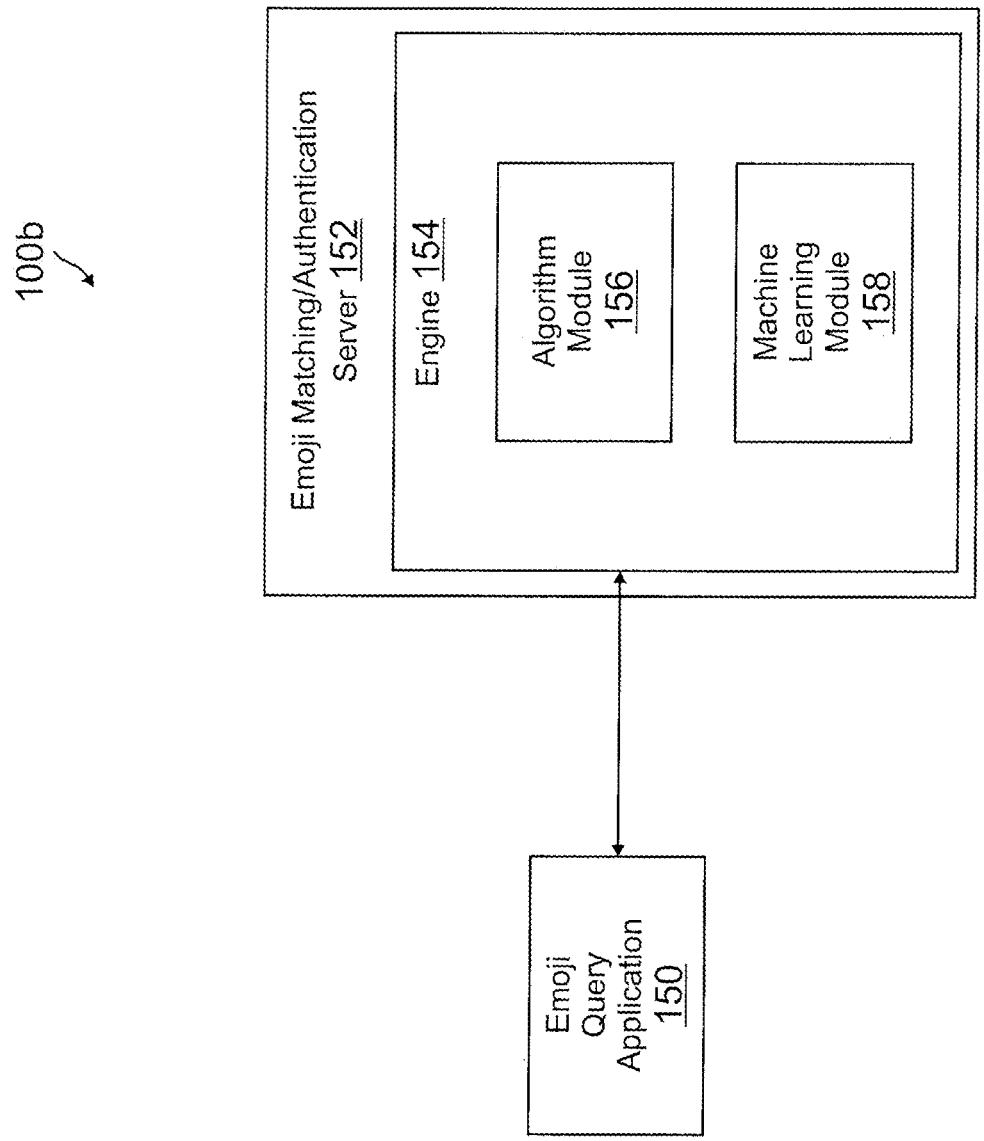
FIG. 1B is a block diagram of a server component for implementing the processes described herein, according to an embodiment.

FIG. 1B is a block diagram of a server component for implementing the processes described herein, according to an embodiment. In this regard, environment 100*b* includes emoji query application 150 corresponding generally to the specialized hardware and/or software modules and processes described in reference to FIG. 1A. In this regard, emoji query application 150 may be in communication with an emoji matching/authentication server 152, which may correspond to an internal component or module of emoji query application 150 and/or a server or other device or application in communication with emoji query application 150.

Emoji matching/authentication server 152 may correspond to a server, such as a device or application, which may be utilized to score visual data captured of a user in response to displayed emojis or other images/icons, as well as receive input from an agent or administrator of emoji matching/authentication server 152 and learn over time when authentication through miming emojis is required and how to authenticate a user based on present visual data of a user miming one or more emojis compared to past visual data of the user previously miming the same or similar emojis. For example, an engine 154 of emoji matching/authentication server 152 uses machine learning and artificial intelligence techniques, in some embodiments, that provide accurate authentication of a user through processing, matching, and/or scoring present visual data against past visual data. (Note that as used herein, the term "engine" refers simply to executable program instructions and/or machines that perform one or more described tasks as described herein, and is not intended to imply any specific limitations relative to other possible external uses of this term.)

In this regard, engine 154 includes an algorithm module 156 and a machine learning module 158. Algorithm module 156 comprises program instructions that are executable to determine an authentication of a user, for example, by analyzing present visual data of a user captured in response to the user miming one or more displayed emojis using past visual data of the user miming or imitating the same or similar emoji. Accordingly, algorithm module 156 may give different weighting to various items, features, and/or information in the present visual data and the past visual data in determining the authentication. Algorithm module may take input present visual data and score the present visual data against past visual data in order to determine an authentication of the user, as discussed herein. In this regard, the scoring may be dependent on the different weights, for example, providing similarities between eyes and mouth a 75% weight, while eyebrows and forehead are provided a smaller weight, such as 25% or less. Algorithm module 154 may provide additional analysis of present visual data required to authenticate the user, including analysis of differences, and weights applied to the differences. Once a score is determined, algorithm module 154 may determine whether the score meets, exceeds, or does not exceed a required score to authenticate the user, and may perform authentication of the user based on the score.

Note that while some discussion herein describes determining authentication of the user in response to a provided authentication query having one or more displayed emojis, engine 154 may generally determine one or more authentications for the user depending on transaction risk or other security required for the authentication. Thus, the authentication of the user may be context specific to relate to the required authentication for a process. In this regard, algorithm module 156 may further include algorithms and/or processes to determine when authentication is required based on analysis of potential fraud during authentication. For example, algorithm module 156 may further process information for an authentication request, and determine whether the authentication request requires authentication through the user miming displayed emojis. Thus, algorithm module 156 may determine, based on authentication risk, when a transaction or other process requiring user authentication, requires authentication through the user miming emojis, and may initiate a process to provide the user with an emoji pattern for display to capture present visual data of the user.

Machine learning module 158 may receive any or all of the data that is input to algorithm module 156, and may update algorithm module 156 based on this and other data received subsequent to the authentication of a user through visual data captured of the user miming emojis and/or determination of when authentication of the user through the user miming emojis is required. Thus, another input to machine learning module 158 is an authentication request. Broadly, machine learning module 158 is capable of taking an authentication request, query, and/or resulting visual data and authentication decision, and then based on subsequent information, determining if that authentication was accurate.

Based on this feedback mechanism, algorithm module 156 is updated so that as time goes on, authentications of user through present visual data of the user miming emojis compared to past visual data of the user miming the same or similar emojis can become increasingly precise and relevant. Accordingly, in one embodiment, engine 154 is updated with details regarding a first authentication of a user as well as details of one or more authentication of the user performed subsequent to the initial authentication.

Machine learning module 158 may therefore first obtain a predicted authentication, and then analyze a variety of authentications in the future. For example, machine learning module 158 may process one or more false positives that occur when a correct user is attempting to authenticate through visual data processing of mimed emojis but is rejected and not authenticated. Similarly, machine learning module 158 may process one or more false negatives that occur when a fraudster attempts authentication of another user's account or otherwise breaches the authentication process using visual data of the fraudster and attempts an account takeover. Trained human agents may be invoked to provide information on what is a false positive or a false negative during authentication. Thus, the agent may assist in adjusting weighted features, match scoring, or other visual data point to aid in machine learning module 158 tuning for the process to authenticate through visual data of mimed emojis in algorithm module 156. The agents may view the false positives and/or false negatives in order to correct authentication processes using past/present visual data of a user miming one or more emojis through machine learning module 158. In this regard, a smart tightening process of machine learning module 158 may be used where decisions made in the matching algorithm are based on a finer granularity of vector analysis in the past/present visual data, requiring more pixels or higher fidelity in visual data, and/or utilizing more points of interest in the visual data (e.g., additional feature analysis of facial and/or body visual data). Additionally, selective high risk tightening processes of machine learning module 158 may be implemented to increase authentication security by an agent. In such embodiments, once a pattern of authentication is established, high risk and low risk transactions may be determined, which may be based on factors such as originating authentication device geo-location, IP address, login time, transaction amount, transaction item, or other information. In this regard, high risk characteristics of the transaction (e.g., transactions originating from Nigeria or Vietnam where the user generally transacts in California) can be subject to more computational complexity based on requirements set by the agent.

Figure 2B:
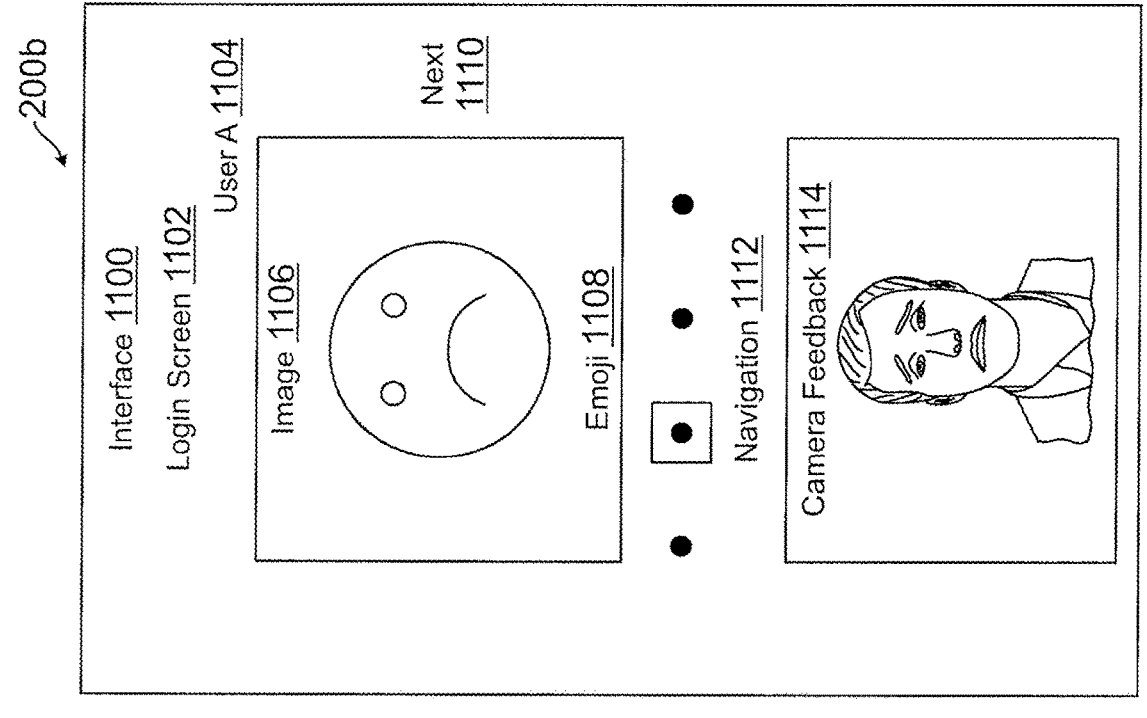
FIG. 2B is an exemplary graphical user interface of an application capturing visual data of a user after miming displayed images for use in authenticating the user, according to an embodiment.
Figure 2A:
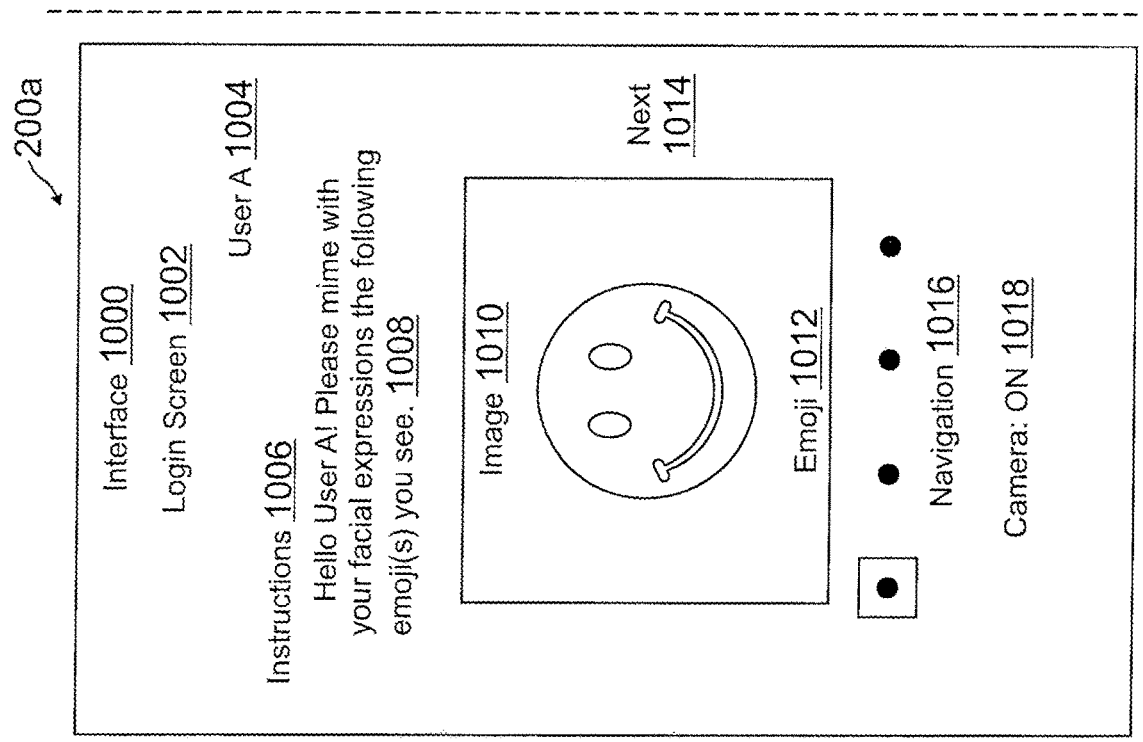
FIG. 2A is an exemplary graphical user interface of an application displaying images and instructions for miming the image by a user during user authentication, according to an embodiment.

FIG. 2A is an exemplary graphical user interface of an application displaying images and instructions for miming the image by a user during user authentication, according to an embodiment. Environment 200a includes a user utilizing a communication device displaying an interface 1000, where the communication device may correspond generally to the described features, processes, and components of communication device 110 in environment 100a of FIG. 1A. In this regard, a user viewing interface 1000 on the communication device may view processes and features corresponding to an interface of an authentication application, such as authentication application 120 of communication device 110 in environment 100a of FIG. 1A.

Interface 1000 in environment 200b display an interface of a communication device during an authentication request, which may include an authentication query for the user to complete in order to receive authentication during the authentication request. In this regard, interface 1000 includes a login screen 1002 that may be displayed during the authentication request, for example, where the user is requesting login for based on a user account selected as user A 1004. In response to the authentication request for the login, instructions 1006 may be displayed for the user based on the authentication query required to be completed by the user. For example, text 1008 in instructions 1006 displays, "Hello User A! Please mime with your facial expressions the following emoji(s) you see."

Additionally, with instructions 1006, the user viewing interface 1000 may view an image 1010. Image 1010 may be included with the authentication query and may be determined by the communication device displaying interface 1000 or determined by a service provider. Image 1010 includes an emoji 1012 displayed to the user, where the user is required to mime emoji 1012 so that the user performs an expression matching emoji 1012. The user may be able to navigate between emojis the user is required to perform using next button 1014, as well as a navigation pane 1016. Utilizing next button 1014 and navigation pane 1016, the user may respond to the emojis in the authentication query, which may be used to authenticate the user. Moreover, a camera configuration button 1018 may be used to turn a camera of the communication device on so that the user may record visual data of the user miming the emojis.

FIG. 2B is an exemplary graphical user interface of an application capturing visual data of a user after miming displayed images for use in authenticating the user, according to an embodiment. Environment 200b includes a user utilizing a communication device displaying an interface 1100, where the communication device may correspond generally to the described features, processes, and components of communication device 110 in environment 100a of FIG. 1A. In this regard, a user viewing interface 1100 on the communication device may view processes and feature corresponding to an interface of an authentication application, such as authentication application 120 of communication device 110 in environment 100a of FIG. 1A.

Interface 1100 in environment 200b displays an interface of the communication device during an authentication process having captured visual data of a user miming a displayed emoji. In this regard, interface 1100 includes a login screen 1102 for a user account for user A 1104. Additionally, during the authentication request for the login to the user account for user A 1104, an image 1106 may be displayed to the user, where image 1106 includes an emoji 1108. The user may mime emoji 1108 in order to perform authentication. Moreover, the user may navigate between emojis the user is required to mime using a next button 1110 and a navigation pane 1112. The user may also view recorded visual data of the user in camera feedback 1114. The visual data displayed in camera feedback 1114 may be recorded of the user and used to compare to past visual data of the user in order to authenticate the user.

Figure 3:
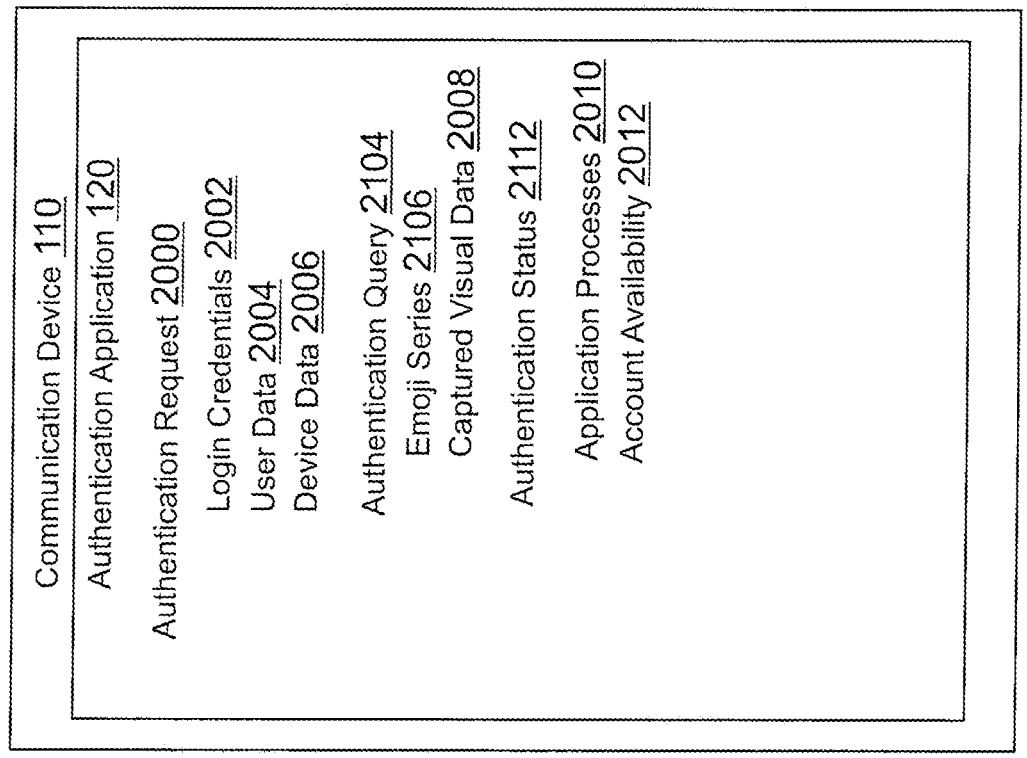
FIG. 3 is an exemplary system environment showing a communication device interacting with a service provider for authenticating a user through visual data of a user miming displayed images, according to an embodiment.

FIG. 3 is an exemplary system environment 300 showing a communication device interacting with a service provider for authenticating a user through visual data of a user miming displayed images, according to an embodiment. FIG. 3 includes communication device 110 and merchant device 140 both discussed in reference to environment 100a of FIG. 1A.

Communication device 110 executes authentication application 120 corresponding generally to the specialized hardware and/or software modules and processes described in reference to FIG. 1A. In this regard, authentication application 120 may be utilized to display an authentication query having one or more emojis displayed to a user, and generate visual data of the user in response to the displayed authentication query. In this regard, authentication application 120 includes an authentication request 2000. Authentication request 2000 may correspond to a request to authenticate a user, which may include login credentials 2002, user data 2004, and device data 2006. Authentication request 2000 may be communicated to service provider server 140, which may provide authentication query 2104 back to communication device 110 based on authentication request 2000. Authentication query 2104 may include an emoji series 2106 for display to the user of communication device 110, which may record captured visual data 2008 in response to emoji series 2106. Additionally, authentication application 120 may include an authentication status 2112, which may include available application processes 2010 and account availability 2012.

Service provider server 140 executes emoji query application 150 corresponding generally to the specialized hardware and/or software modules and processes described in reference to FIG. 1A. In this regard, emoji query application 150 may execute processes to authenticate a user based on captured visual data of the user miming one or more emojis. Thus, emoji query application 150 includes an emoji response authentication process 2100, where emoji response authentication process 2100 includes the received authentication request 2000 from communication device 110. Authentication request 2000 is received with login credentials 2002, as well as user data 2004 and device data 2006. Authentication request 2000 may be processed with login credentials 2002, user data 2004, and device data 2006 to determine a fraud risk 2102. Thus, authentication query 2104 may be determined, which may be determined based on fraud risk 2102 and/or based on security requirements of service provider server 140. Authentication query 2104 includes an emoji series 2106. In response to authentication query 2104, captured visual data 2008 may be received, which may be compared to past visual data 2108 to determine similarities 2110. Thus, using similarities 2110, emoji query application 150 may determine authentication status 2112. Emoji query application 150 may further include emoji response data 2114, which may include past visual data 2108 and other users visual data 2116 used to determine authentication status 2112.

Figure 4:
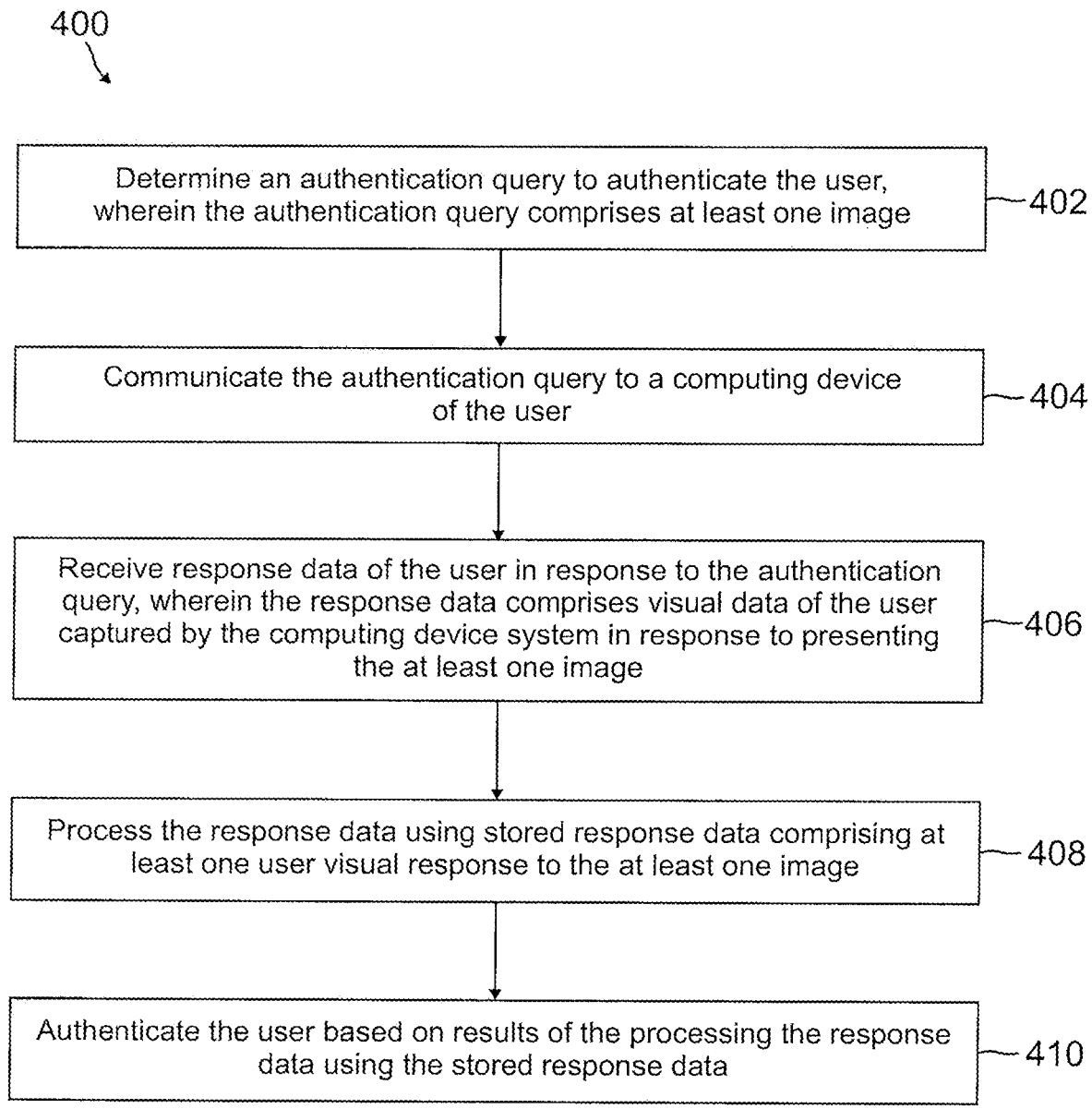
FIG. 4 is a flowchart of an exemplary process for visual data processing of mimed images for authentication, according to an embodiment.

FIG. 4 is a flowchart 400 of an exemplary process for visual data processing of mimed images for authentication, according to an embodiment. Note that one or more steps, processes, and methods described herein may be omitted, performed in a different sequence, or combined as desired or appropriate.

At step 402, an authentication query to authenticate a user is determined, wherein the authentication query comprises at least one image. The authentication query may be generated in response to receiving an authentication request for the user. The authentication request may correspond to a login request for an account of the user. It may be determined that the login request has a degree of risk that the login request is a fraudulent login request. Thus, the authentication request may be generated in response to the determining that the login request has the degree of risk, wherein a number of at least two images is based on the degree of risk. The at least one image may be determined from images or icons, such as emojis. The emoji may therefore comprise a digital icon or a digital image used in electronic communication to express an emotion or an idea. At step 404, the authentication query is communicated to a computing device of the user. The authentication query may further comprise instructions to the user, wherein the instructions instruct the user to mime each of the at least two images when the each of the at least two images is presented to the user. Response data of the user is received in response to the authentication query, wherein the response data comprises visual data of the user captured by the computing device in response to presenting the at least one image, at step 406.

At step 408, the response data is processed using stored or past response data comprising at least one user visual response to the at least one image. The past response data may comprise past visual data comprising at least one of facial data for a face of the user or body data for a body of the user. The past visual data may comprise one of a past reaction, a past imitation, or a past mime of the images or the icons presented to the user, wherein the present visual data may similarly comprise one of a present reaction, a present imitation, or a present mime of the at least two images presented to the user. The past visual data may comprise at least one of an image of the user, a plurality of images of the user, a video of the user, or a plurality of videos, wherein the past visual data is previously captured of the user in response to displaying images to the user during a process to establish authentication for the account of the user, and wherein the images include the at least one image displayed to the user.

Thus, at step 410, the user is authenticated based on results of the processing the response data using the stored response data. The response data may be processed using the stored or past response data by comparing the response data to the past response data and determining similarities between the user captured in present visual data for the response data and past visual data for the past response data. The results may comprise a similarity score based on the determining the similarities, wherein the authenticating the user based on the results comprises determining whether the results exceed a similarity score threshold. Additionally, the determining the similarities may use facial similarities of present facial expressions of the user captured in the present visual data and past facial expressions of the user captured in the past visual data from the response data and the past response data, respectively. Thus, the past facial expressions captured of the user in the past visual data may comprise past transitions expressions of the user between at least two mimicked expressions by the user, wherein the present facial expressions captured of the user in the present visual data may comprise present transition expressions of the user between mimicking the at least two images in the authentication query. Furthermore, the past transitions expressions may be captured in one of past images of the user or past videos of the user in response to displaying the images or the icons to the user, wherein the present transition expressions may be captured in one of present images of the user or present videos of the user captured in response to displaying the at least two images. The past facial expressions may also further be between a rest facial expression of the user and the at least two mimicked expressions. In various embodiments, less than a full match of present visual data to past visual data for a pattern of emojis may be required, for example, where the user is matched in three out of five displayed emojis based on the user's provided present visual data.

The at least one image may also comprise at least two images, wherein the at least two images are presented in an ordered pattern to the user, and wherein the authenticating the user is further based on images or video of the user captured between presentation of the at least two images in the ordered pattern. In various embodiments, a request to establish user specific visual responses to emojis for the user may be received, and a test emoji pattern for the user is generated, wherein the test emoji pattern comprises a series of emojis presented to the user. This test emoji pattern may be communicated to the user, where user specific visual response data for the user is received in response to the user viewing the test emoji pattern. Thus, the stored response data having past visual data for the user may comprise the user specific visual response data. The stored response data may be updated based on the visual data of the user captured by the computing device. Additionally it may be requested that the user perform an update of the user specific visual response data, wherein the update comprises a new test emoji pattern. Thus, new user specific visual response data for the user may be received in response to the user viewing the new emoji test pattern and the user specific visual response data may be updated with the new user specific visual response data. In this regard, a special case may occur where the user changes facial and/or body appearance and is required to update their past visual data, for example, where the user receives facial surgery, a facial image, or otherwise alters their facial and/or body appearance. In this regard, the past visual data stored to a database of the authentication system may be cleared, and the user may be on-boarded again through an initial process to set past visual data for the user as discussed herein. Additionally, to ensure that the user did change facial/body appearance, an authority body may be contacted, such as a hospital and/or doctor, or public records may be accessed and/or processed. Additionally, an agent may be utilized in order to confirm the change in facial/body appearance.

Figure 5:
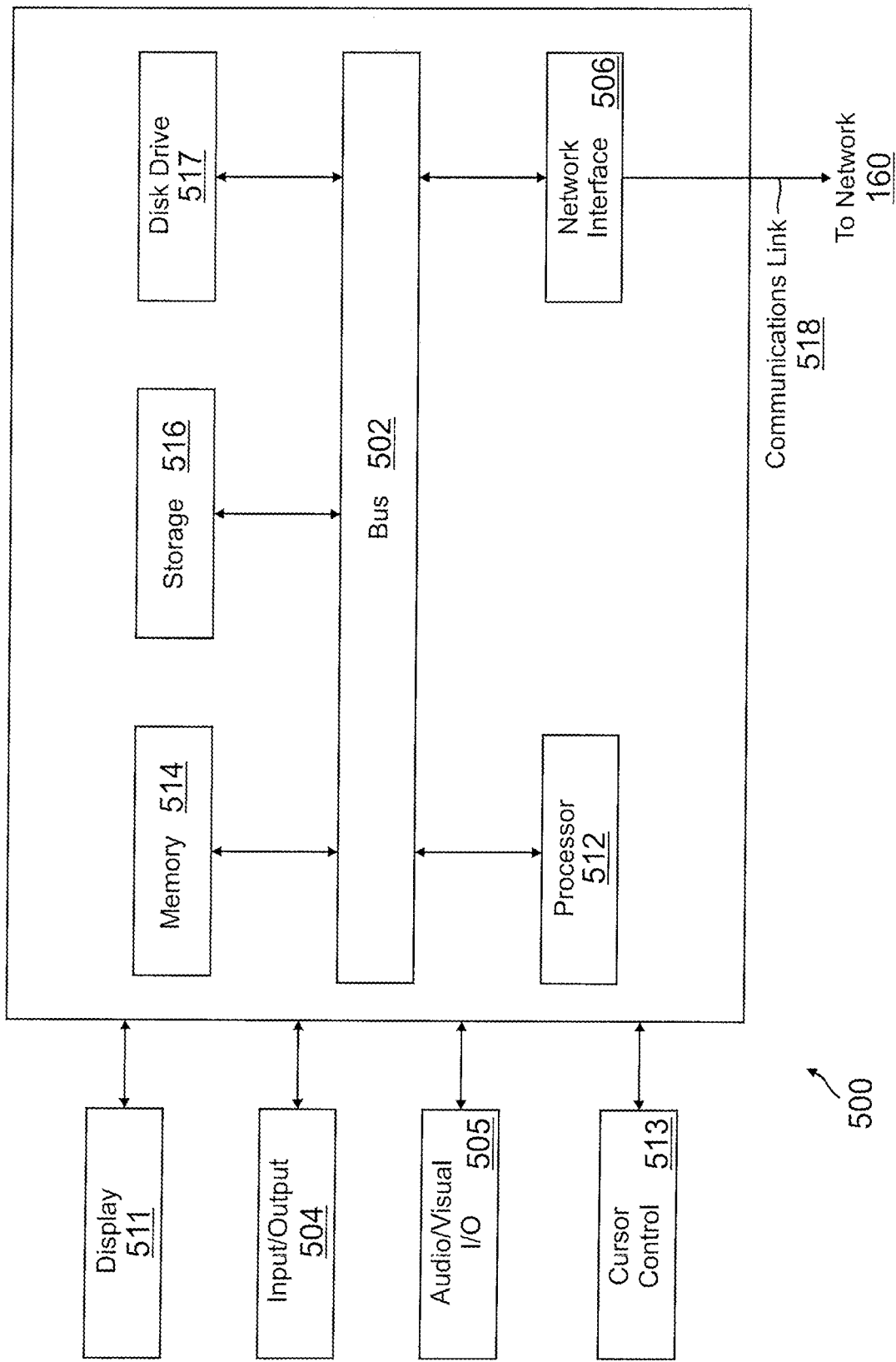
FIG. 5 is a block diagram of a computer system suitable for implementing one or more components in FIG. 1A, according to an embodiment.

FIG. 5 is a block diagram of a computer system suitable for implementing one or more components in FIG. 1A, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 160. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
   a non-transitory memory; and
   one or more hardware processors coupled to the non-transitory memory and configured to read instructions from the non-transitory memory to cause the system to perform operations comprising:
   receiving, over a network connection, an authentication request for a user associated with a mobile device;
   retrieving, by the system, a plurality of visual data corresponding to the user;
   generating, by the system, a verification query in response to the authentication request;
   transmitting, over the network connection, the verification query to the mobile device of the user, the verification query including a request for the user to imitate at least two of the plurality of visual data depicted in an image presented and a request for an authentication factor;
   receiving, over the network connection, captured visual data depicting an imitation of the at least two of the plurality of visual data, and the authentication factor, and a transition by the user between each of the at least two of the plurality of visual data;
   performing a matching of the transition to an amount of time for the user to imitate the at least two of the plurality of visual data; and
   authenticating, by the system, the user, the authenticating based on a comparison between the captured visual data and the plurality of the visual data, a verification of the authentication factor, and the matching.

2. The system of claim 1, wherein the authentication request includes a user login request for the user.

3. The system of claim 1, wherein the plurality of the visual data are retrieved for the user based on user account information included in the authentication request.

4. The system of claim 1, wherein one or more of the at least two of the plurality of visual data is an emoji.

5. The system of claim 1, wherein the plurality of visual data include previously captured reactions, pictures, selfies, and/or videos of the user.

6. The system of claim 1, wherein prior to the authenticating, the operations further comprise:
   determining a similarity score between the captured visual data and the plurality of the visual data; and
   determining that the similarity score meets or exceeds a threshold score.

7. The system of claim 6, wherein the comparison is further based on the determining that the similarity score meets or exceeds the threshold score.

8. The system of claim 1, wherein prior to the authenticating, the operations further comprise:
   determining a level of certainty that the user is present in the captured visual data.

9. The system of claim 8, wherein the verification of the authentication factor is based on verified in response to the level of certainty determined.

10. A method comprising:
    receiving, over a network connection by a system, an authentication request for a user associated with a mobile device;
    retrieving, by the system, a plurality of visual data corresponding to the user;
    generating, by the system, a verification query in response to the authentication request;
    transmitting, over the network connection, the verification query to the mobile device of the user, the verification query including a request for the user to imitate at least two of the plurality of visual data depicted in an image presented and a request for an authentication factor;
    receiving, over the network connection, captured visual data depicting an imitation of the at least two of the plurality of visual data, the authentication factor, and a transition by the user between each of the at least two of the plurality of visual data;
    performing a matching of the transition to an amount of time for the user to imitate the at least two of the plurality of visual data; and
    authenticating, by the system, the user, the authenticating based on a comparison between the captured visual data and the plurality of the visual data, a verification of the authentication factor, and the matching.

11. The method of claim 10, wherein the plurality of the visual data are retrieved for the user based on user account information included in the authentication request.

12. The method of claim 10, wherein one or more of the at least two of the plurality of visual data is an emoji.

13. The method of claim 10, wherein the plurality of visual data include previously captured reactions, pictures, selfies, and/or videos of the user.

14. The method of claim 10, wherein prior to the authenticating, the method further comprises:
    determining a similarity score between the captured visual data and the plurality of the visual data; and
    determining that the similarity score meets or exceeds a threshold score.

15. The method of claim 14, wherein the comparison is further based on the determining that the similarity score meets or exceeds the threshold score.

16. A non-transitory machine-readable medium having stored thereon machine-readable instructions executable to cause a machine to perform operations comprising:
    receiving, over a network connection by a system, an authentication request for a user associated with a mobile device;
    retrieving, by the system, a plurality of visual data corresponding to the user;
    generating, by the system, a verification query in response to the authentication request;
    transmitting, over the network connection, the verification query to the mobile device of the user, the verification query including a request for the user to imitate at least two of the plurality of visual data depicted in an image presented and a request for an authentication factor;
    receiving, over the network connection, captured visual data depicting an imitation of the at least two of the plurality of visual data, the authentication factor, and a transition by the user between each of the at least two of the plurality of visual data;
    performing a matching of the transition to an amount of time for the user to imitate the at least two of the plurality of visual data; and
    authenticating, by the system, the user, the authenticating based on a comparison between the captured visual data and the plurality of the visual data, a verification of the authentication factor, and the matching.

17. The non-transitory machine-readable medium of claim 16, wherein prior to the authenticating, the operations further comprise:
   determining a similarity score between the captured visual data and the plurality of the visual data; and
   determining that the similarity score meets or exceeds a threshold score.

18. The non-transitory machine-readable medium of claim 17, wherein the comparison is further based on the determining that the similarity score meets or exceeds the threshold score.

19. The non-transitory machine-readable medium of claim 16, wherein prior to the authenticating, the operations further comprise:
   determining a level of certainty that the user is present in the captured visual data.

20. The non-transitory machine-readable medium of claim 19, wherein the verification of the authentication factor is based on the level of certainty.

* * * * *

UNITED STATES PATENT AND TRADEMARK OFFICE
CERTIFICATE OF CORRECTION

| | |
|---|---|
| PATENT NO. | : 11,017,070 B2 |
| APPLICATION NO. | : 16/455738 |
| DATED | : May 25, 2021 |
| INVENTOR(S) | : Srivathsan Narasimhan |

It is certified that error appears in the above-identified patent and that said Letters Patent is hereby corrected as shown below:

In the Claims

In Claim 1, Column 27, Line 31: please remove "and".

In Claim 9, Column 27, Line 66: please remove "verified in response to".

In Claim 9, Column 27, Line 67: please remove "determined".

Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*